Nov. 24, 1964    J. W. HIGLEY ETAL    3,158,809
SUSPENSION SYSTEM FOR MOVABLE ELEMENTS
OF ELECTRICAL INDICATING INSTRUMENTS
Filed June 28, 1962    2 Sheets-Sheet 1
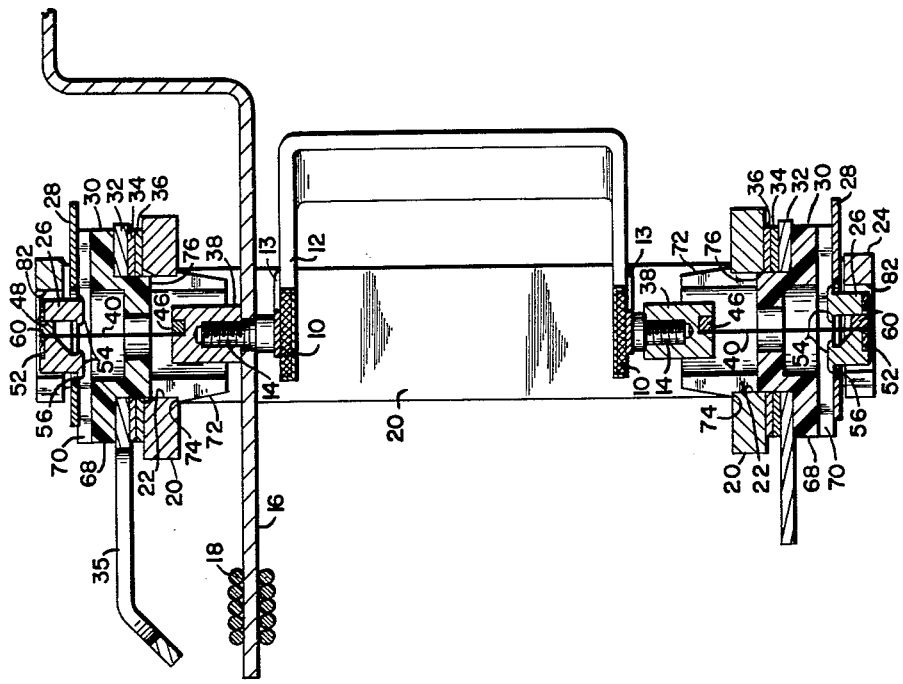
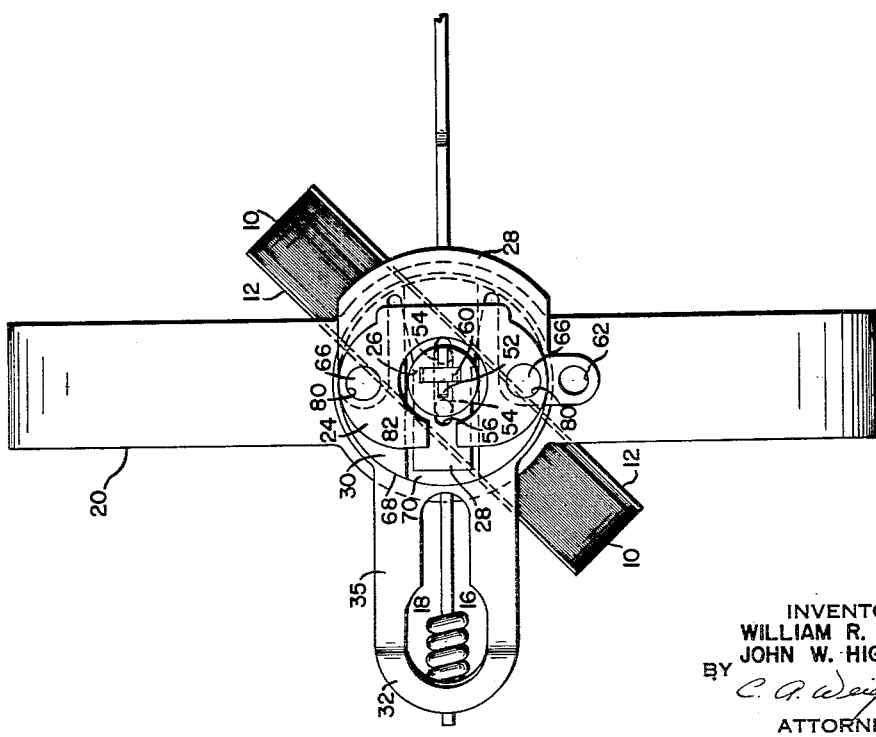
INVENTORS
WILLIAM R. BROPHY
JOHN W. HIGLEY
BY
C. A. Weigel, Jr.
ATTORNEY

INVENTORS
WILLIAM R. BROPHY
JOHN W. HIGLEY
BY
ATTORNEY

3,158,809
SUSPENSION SYSTEM FOR MOVABLE ELEMENTS OF ELECTRICAL INDICATING INSTRUMENTS
John W. Higley, Glen Ridge, and William R. Brophy, Roselle Park, N.J., assignors to Weston Instruments, Inc., a corporation of Texas
Filed June 28, 1962, Ser. No. 206,051
3 Claims. (Cl. 324—154)

The invention relates to a suspension system for movable elements and, more particularly, to a suspension system for the movement of an electrical indicating instrument. In its preferred form the suspension system utilizes a taut metal band or ribbon to suspend an electrical meter movement. The taut band provides a restoring torque and a bearing support for the meter movement as well as an electrical connection to its electrical coil.

At the present time, the movable element of most electrical indicating instruments is pivoted, or mounted, by a pivot turning in a conical jewel bearing. The relative motion occurring between the pivot and bearing unfortunately is subject to a certain amount of friction which places a limit on both the sensitivity and the accuracy of the instrument.

The decrease in instrument sensitivity due to friction is directly proportional to the weight of the movable element and inversely proportional to the restoring torque of the control springs. There are many ways to increase the sensitivity of a direct current (D.C.) indicating instrument. Among others, one may reduce the restoring torque or increase the torque generated by the electromotive force by increasing the number of turns of wire, but the latter expedient adds to the weight of the moving element and hence increases the friction. In like manner, reducing the restoring torque increases the effect of the friction on the sensitivity of the instrument. This creates a rather difficult design problem to which there is no completely satisfactory solution. The increase in restoring torque and the reduction in weight, which are required to minimize the effects of friction, limit the maximum sensitivity of typical instruments.

Another disadvantage of conventional type indicating instruments using pivots and jewels is that vibration causes an undue amount of wear. Wear can be reduced by proper selection of materials for these parts but it cannot be eliminated. Such wear causes changes in the contour of the pivots and jewels and results in an increase in the amount of friction in the bearing.

Accordingly, it is an object of this invention to suspend the moving element of an electrical indicating instrument such that it is substantially free of the effects of friction.

One of the known substitutes for a pivot and jewel system is a taut band suspension system. In a taut band system, a coil or element is suspended by a fine metallic band or ribbon. The suspension ribbon replaces the control springs, pivots and jewels of the convention instruments to provide the necessary restoring torque, support and electrical connection to the moving coil. Taut band suspension systems have many potential advantages, two of which are (1) increased electrical sensitivity due to the reduction of friction in the movement and (2) increased service life of the instrument because of the reduction in wear.

Unfortunately, however, many of these advantages have not been fully realized in taut band suspension systems. Among the reasons why these advantages have not been realized are difficulties that have been encountered in properly mounting or terminating the taut band. If, for example, the band is not adequately terminated, it may slip thereby changing the response characteristics of the moving element. Additional difficulites have been encountered when the taut band is terminated by bending. Such termination causes stress concentrations which distort the response of the moving element.

Many taut band termination systems have been of a relatively complex design such that they are difficult and tedious to construct and assemble. Still another disadvantage of such prior art taut band suspension systems has been their susceptibility to vibration. Under severe vibration conditions, such as those brought on by a sudden shock, there often occurs an excessive displacement of the movable element which tends to overstress the band and require its replacement.

It is, therefore, another object of this invention to obviate many of the disadvantages of the prior art taut band suspension systems for movable elements.

An additional object of this invention is to provide a taut band suspension system for an electrical indicating instrument that is capable of ready adjustment to a zero position.

In accordance with a preferred embodiment of the invention, a fine metallic band or ribbon is attached to each of the opposite sides of the movement of an electrical indicating instrument. Rotation of the movement is permitted by a twisting of the band. Each band is terminated at each of its ends by a malleable piece of metal which is wedged or staked into a slotted member to hold the band securely against one side of the slot. By positioning the slots such that each ribbon's major axis coincides with the axis of rotation of the movement and both axes lie in the plane of the side of the slots, the active length of each ribbon is relatively free of bends. This improves the linearity of the instrument.

The slotted members which secure the fixed ends of the bands are held by respective spring members which impart tension to the band. The spring members are mounted on hollow cylindrical hubs which are snapped into mounting apertures in the movement bracket of the instrument. The hubs extend coaxially about the slotted members which secure the moving end of the band to limit excessive radial displacement of the movement. A shouldered section inside the hub limits excessive axial, or, end-to-end displacement of the movement.

These and other objects, features and advantages of the invention will be best understood from a study of the following detailed description taken in conjunction with the claims and with the drawings in which:

FIGURE 1 is a side view shown partly in section of a suspension system constructed in accordance with this invention, for the movement of a typical moving coil type electrical indicating instrument;

FIGURE 2 is an end view of the suspension system of FIGURE 1; and

Figure 3:
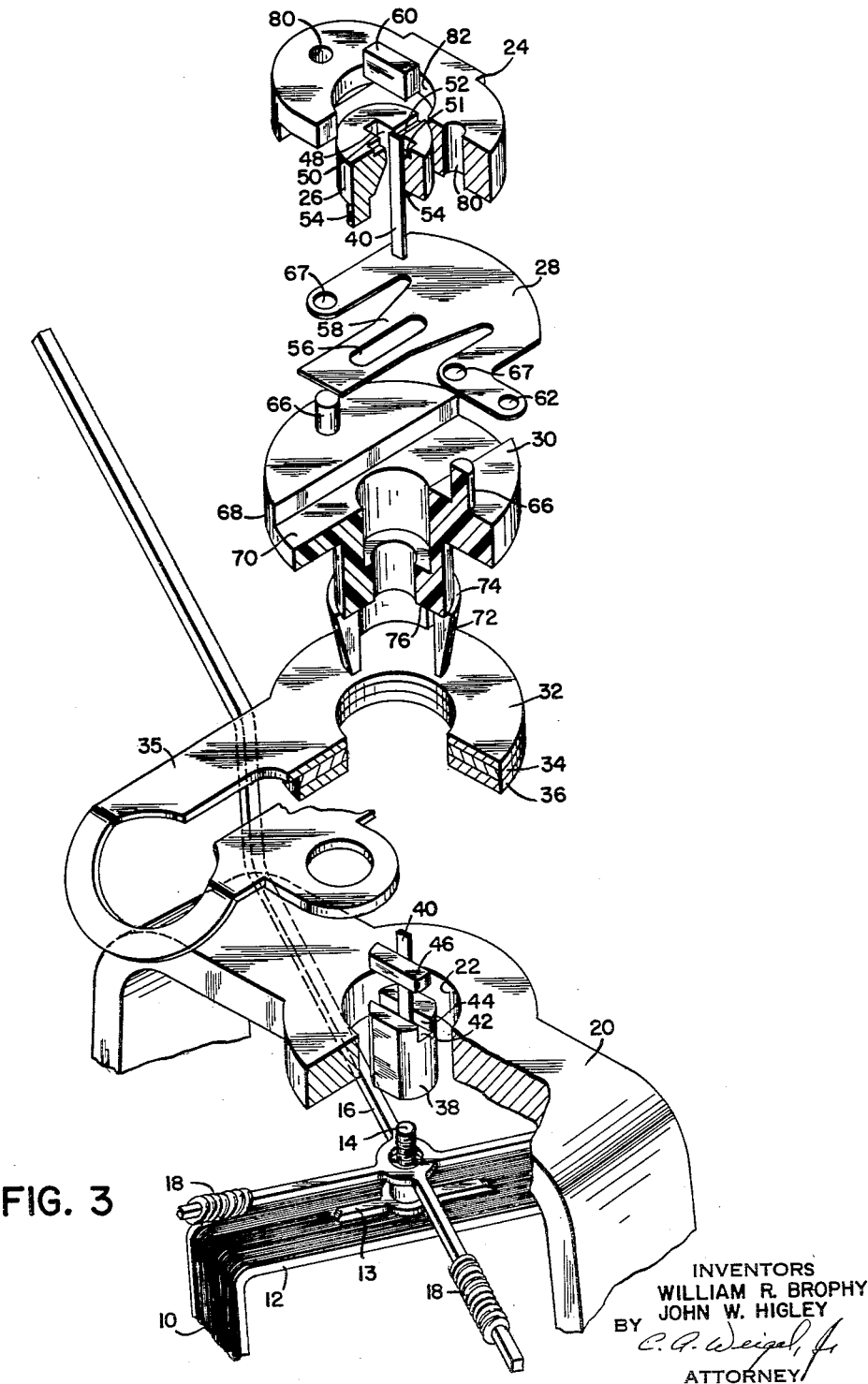
FIGURE 3 is an exploded, perspective view, with portions broken away, of the taut band suspension mounting mechanism constructed in accordance with this invention.

In the drawings there are illustrated the details of a taut band suspension system constructed in accordance with this invention for the movement of an indicating instrument. The drawings show a movable element 10 which includes a coil of wire wound on a frame member 12. At the pivot ends of the movable element 10, pivot bases 13 are mounted on the axis of rotation of the moving element 10. The pivot bases 13, which may be cemented to the moving element 10, each have a stud 14 into which threads are cut. The balance cross 16 of the instrument, which includes a pointer arm is placed over one of the threaded studs 14. Balance weights 18 may be placed on the ends of the arms of the balance cross 16.

The movable element 10 is rotatably mounted in a bridge or movement bracket 20 so as to be rotatable about an imaginary axis (the axis of rotation) taken through the studs 14. The movement bracket 20 includes a pair of apertures 22 in opposite sides thereof. The apertures 22 are formed to be coaxial with the axis of rotation of the movable element 10 and preferably are circular in cross section.

In accordance with this invention, the novel suspension system for suspending the movable element 10 includes a stop plate 24, a first hub 26, a tension spring 28, a second hub 30, an abutment plate 32, a spacer washer 34, a spring washer 36, an anchor nut 38, and a suspension band 40 positioned within each aperture 22. The anchor nut 38, which may be die-cast from brass or other suitable non-magnetic material, is formed to have an end slot 42. The end slot 42 is positioned such that one side 44 lies in a plane which includes the axis of rotation of the movable element 10. The suspension band 40, which preferably is a platinum-nickel alloy, is selected to have high tensile and shear strength, good electrical conductivity, resistance to corrosion, a linear torque-deflection or twist angle relationship, and a low temperature coefficient of resistance. In a typical sensitive electrical indicating instrument, i.e. zero to two microamperes for full scale deflection, the suspension band 40 is selected to be .002" wide by .0002" thick.

The suspension bands 40 should have a torque-deflection relationship which is substantially linear in both senses such that once the band is deflected, it will return to its initial position. The band may be either rolled or drawn; however, a drawn-type band has been found to be preferable in that it exhibits a more uniform torque gradient over the length of the band and it also has a good ability to return to its initial or zero condition. The suspension bands, which are basically the heart of a suspension-type system, perform three distinct functions; namely, they provide (1) the restoring torque for the movable element 10, (2) support for the movable element 10, and (3) electrical connections to the coil 11 of the movable element 10. Since the suspension mounting for each pivot base 13 is substantially identical, only one, as shown for example in FIGURE 3, will be described in detail. Each has the same reference numerals for like elements.

The suspension band 40 is secured to one side 44 of the end slot 42 in the anchor nut 38 by a first wedge 46 which is forced or staked into the end slot 42. The end slot 42 is off-center to permit the one side 44 to lie on the axis of rotation of movable element 10. The wedge 46 preferably is of a soft metal such as the aluminum alloy 2024–T6 (Aluminum Association Standard). In typical instruments using a band 40 of 0.0002" thickness, the slot 42 has a width of 0.020" and the wedge 46 has a width of 0.018". The energy necessary to securely anchor the band 40 in the slot 42 by such a wedge 46 is 1 in.-lb.

The anchor nut 38 is threaded onto the stud 14 of the pivot base 13. The anchor nut 38 locks the balance cross 16 and pointer in place on the movable element 10. An electrical connection to the coil is provided by the metal-to-metal contact of the anchor nut 38 on the stud 14 which, in turn, is electrically connected to the coil 11.

The mechanical connection of the band 40 to the moving element 10 is such that the active length of the band 40 is free of bends (which would distort its torque-deflection characteristic) and the band cannot shift at its point of termination.

The fixed end of the band 40 (the upper end in the drawing of FIGURE 3) is terminated in a first small hub 26 which may be die-cast from a zinc alloy to have a cylindrical shape. The first hub 26 is hollow and has an end slot 48. The end slot 48 is off-center to permit one side 50 to lie on the axis of rotation of the movable element 10. Small shoulders 51 define the bottom (in the drawing of FIGURE 3) of the end slot 48. A small solder slot 52, transverse to the one side 50, is also formed in the first hub 26.

A second wedge 60 is driven or staked into the slot 48 of the first hub after soldering the band 40 in the solder slot 52 to terminate the fixed end of the suspension band 40 against the one side 50. In a typical instrument, the slot width is .020" and the wedge 60 width is .0195". The second wedge 60 may be an aluminum alloy 1180–S0 (Aluminum Association Standard). With 1 in.-lb. of energy to drive the wedge 60, the band 40 is secured without bends with its entire length lying on the axis of rotation of the moving coil 10. The central portion of the first hub 26 is hollow and has an inverted V-shape, the apex of the V terminating at the one slot side 50. The band 40 is positioned in both slots 42 and 48 such that its major axis substantially coincides with the axis of rotation of the movement 10.

The lower portion (in FIGURE 3) of the first hub 26 has two pins 54 to facilitate its mounting in a slot 56 of the tension spring 28. The tension spring 28 is incorporated into the design of the taut band suspension system of this invention to prevent excessive sagging of the movable element 10 due to gravity. The tension spring 28 may be fabricated into an E-shape from beryllium copper which has a good spring characteristic. The center leg 58 of the E-shaped, tension spring 28 includes the slot 56 into which the pins 54 of the first hub 26 are driven or staked.

The tension spring thickness is selected typically to provide from 10 to 50 grams of tension, depending, of course, upon the particular weight movement used. The value of the tension may be varied by selecting the thickness of the tension spring 28 and also by bending the center leg 58. One of the legs of the tension spring 28 has a small soldering lug 62 formed thereon to provide an electrical connection to the spring 28 and hence to the suspension band 40 through the first hub 26. Additionally, holds 67 are formed at the ends of each of the outside legs of the E-shaped tension spring 28 to permit its mounting on the pins 66 of the second hub 30.

The second hub 30 is large with respect to the first hub 26 and is fabricated out of an insulating material such as nylon. The second hub 30 is hollowed and cylindrical in shape having a flanged top portion 68 in which is formed a cross slot 70 of sufficient width to accept the flexure of the center arm 58 of the tension spring 28. The lower portion 72 of the second hub 30 is tapered and has a retaining shoulder 74 to permit the hub to be snapped into the aperture 22 of the movement bracket 20. The hub 30 is retained between the flanged portion and the retaining shoulder 74, and its outer central diameter is selected to permit the hub 30 to rotate within the aperture 22.

The inside of the second hub 30 has a stepped or shoulder section 76 such that the inside diameter of the shoulder section 76 is less than the diameter of the anchor nut 38 but greater than the width of the suspension band 40. Its function will be described hereinafter.

The abutment plate 32, the spacer washer 34 and the spring washer 36 are inserted (in the order named) over the shaft portion of the second hub 30 prior to its placement in the aperture 22. These prevent the hub from being loose in the movement bracket and yet still permit its rotation for adjustment of the fixed end of the band 40. The abutment plate 32 may be formed to have an extension arm 35 having slots or holes therein to facilitate its rotation. The surface of the abutment plate 32 adjacent the flange 68 may be scored to provide a friction coupling which causes the second hub to rotate with the abutment plate 32. Finally, a stop plate 24, diecast of a suitable material and having retaining holes 80 for the pins 66, is inserted over the tension spring 28. The pins 66 are hot riveted to secure the tension spring 28. The stop plate 24 has a central aperture 82 formed therein to permit access to the first hub 26. Also one side of the stop plate 24 is cut away to permit some flexure of the center leg 58 of the tension spring 28.

To assemble the taut band suspension system, the anchor nut 38 is screwed on the threaded stud 14. Next, the taut band 40 is placed across the side 44 of the slot 42 in the anchor nut 38 and the wedge 46 is driven into place. The abutment plate 32 and washers 34 and 36 are then placed over the shaft of the second hub 30 and the hub is snapped into the aperture 22. The washer 34 may be omitted or not, depending upon the thickness of the movement bracket 20. The pins 54 of the first hub 26 are then wedged into the slot 56 of the tension spring 28. The tension spring 28 and the stop plate 24 are then placed over the pins 66 of the second hub 30 and the pins hot riveted.

Thus constructed, the suspension system includes a number of stops to prevent excessive travel of both the movable coil 10 and the tension springs 28. These stops prevent damage to the suspension bands 40 that would otherwise occurs from vibration and shock during rough handling in shipping, for example. The stops limit the moving element 10 displacement both axially and radially. Protection of the bands 40 against shock is provided by the anchor nuts 38 striking the inside surface of the second hubs 30 in the event of radial displacement, and striking the shoulder sections 76 in the event of axial displacement. The tension springs 28 which support the suspension bands 40 deflect slightly under shock conditions and provide a mechanical isolation for the suspension ribbons 40. The stop plates 24 prevent excessive deflection of the tension springs 28 in an axial direction, as do the cross slots 70 in the second hubs 30.

The typical characteristics of a conventional pivoted D.C. mechanism and a taut band suspension mechanism of this invention having a sensitivity of 20 microamperes D.C. or 50,000 ohms/volt for full-scale (F.S.) deflection of 100 degrees may be compared by the following table:

| Item | Pivot-Jewel Mechanism | Taut-Band Mechanism |
| --- | --- | --- |
| 1. Friction Error (Percent of F.S.) | 0.75% | Negligible. |
| 2. Temperature Coefficient | 250 p.p.m./° C | Less than 100 p.p.m./° C. |
| 3. Temporary Zero Set (After 8 hours at F.S.), Percent of F.S. | 0.5% | 0.1%. |
| 4. Permanent Zero Set (After 16 hrs. at zero), Percent of F.S. | 0.2% | Negligible. |
| 5. Moving Coil Resistance | 5,400 ohms | 870 ohms. |

The advantages of this invention are seen to be many. Slipping of the suspension band 40 at its termination is substantially eliminated by the clamping action of the wedges 46 and 60. Additionally, the active length of the suspension band 40 is terminated without bending. Stress concentrations due to bending, found in the usual taut band designs of the prior art, are substantially reduced. The large insulating hub 30 limits both the axial and radial movement of the anchor nut 38 under shock conditions, thereby preventing excessive displacement of the movable element 10 to protect the suspension band 40. By movement of the abutment arm 35, the insulating hub 30 may be rotated to provide for zero pointer position correction of the instrument.

Additionally, the anchor nut and first hub subassemblies provide for the convenient replacement of the suspension bands 40. The physical size of the suspension assembly is such that the taut band suspension system may be relatively easily substituted for the pivot and jewel suspension systems as employed in conventional instruments.

There has thus been described a novel suspension for the movements of electrical instruments. The suspension system provides many advantages not to be found in conventional pivot-jewel type assemblies or, for that matter, in known taut band suspension assemblies.

Since many changes could be made in the above construction and many apparently widely-different embodiments of this invention could be made without departing from the scope thereof, it is intended that all matter contained in the above description or shown in the accompanying drawings shall be interpreted as illustrative and not in a limiting sense.

We claim:
1. A system for suspending a movable element, having an axis of rotation, from the movement bracket of an electrical instrument, said system comprising:
   a pair of ribbons, each being substantially free of bends along its entire length and having a major axis,
   a first pair of terminating members, each secured to an opposite side of the movable element at its axis of rotation,
   each of the first pair of terminating members having a slot in the side of the member remote from the movable element adapted to receive one end of a different one of the ribbons, one side of each slot being planar and substantially coinciding with the axis of rotation,
   a first pair of wedges adapted to be driven into the slots of the first pair of members to secure the one end of the ribbons to the respective one side of the slots substantially in the axis of rotation,
   a second pair of terminating members secured to the movement bracket in spaced relation to the first pair of terminating members,
   each of the second pair of terminating members being hollow to receive a different one of the ribbons and having a slot in the side of the member remote from the movable element adapted to receive the other end of a different one of the ribbons, one side of each slot being planar and substantially coinciding with the axis of rotation, and
   a second pair of wedges adapted to be driven into the slots of the second pair of members to secure the other end of the ribbons to the respective one side of the slots such that the major axes of the ribbons and the axis of rotation substantially coincide.

2. A system for suspending a movable element, having an axis of rotation, from the movement bracket of an electrical instrument, said system comprising:
   a pair of ribbons, each being substantially free of bends along its entire length and having a major axis,
   a pair of anchor members, each secured to an opposite side of the movable element at its axis of rotation,
   each anchor member having a slot adapted to receive one end of a different one of the ribbons, one side of each slot being planar and substantially coinciding with the axis of rotation of the movable element,
   a first pair of wedges adapted to be driven into the anchor member slots to secure the one end of the ribbons to the respective one side of the slots substantially in the axis of rotation,
   a pair of spring means secured to the movement bracket for maintaining the ribbons under tension, a pair of hubs mounted on the pair of spring means, each hub having a slot adapted to receive the other end of a different one of the ribbons, one side of each slot being planar and substantially coinciding with the major axes of the ribbons and the axis of rotation of the movable element, a second pair of wedges adapted to be driven into the hub slots to secure the other end of the ribbons to the respective one side of the hub slots such that the major axes of the ribbons and the axis of rotation substantially coincide, and a pair of hollow hubs, each mounted on the movement bracket coaxially of a different one of the anchor members, each hollow hub being provided with surfaces adapted to cooperate with the respective anchor member to limit the radial and axial displacement of the movable element.

3. The system set forth in claim 2 also including stop means for limiting movement of both spring means in a direction substantially parallel to the axis of rotation of the movable element.

References Cited in the file of this patent
UNITED STATES PATENTS

| | | |
|---|---|---|
| 799,733 | Hartmann | Sept. 19, 1905 |
| 2,535,065 | Heiland | Dec. 26, 1950 |
| 2,899,641 | Montgomery | Aug. 11, 1959 |

FOREIGN PATENTS

| | | |
|---|---|---|
| 887,633 | France | Nov. 18, 1943 |
| 1,003,350 | Germany | Feb. 28, 1957 |